United States Patent

Denton et al.

Patent Number: 5,322,151
Date of Patent: Jun. 21, 1994

[54] FRICTION FACINGS FOR CLUTCH PADDLES

[75] Inventors: Gordon W. Denton, Fort Wayne; James K. Tarlton, Auburn, both of Ind.

[73] Assignee: Dana Corporation, Toledo, Ohio

[21] Appl. No.: 887,504

[22] Filed: May 22, 1992

[51] Int. Cl.$^5$ .............................................. F16D 13/60
[52] U.S. Cl. ........................... 192/107 M; 192/107 R; 192/70.14
[58] Field of Search .......... 192/107 R, 107 M, 107 C, 192/70.14

[56] References Cited

U.S. PATENT DOCUMENTS

| | | | |
|---|---|---|---|
| 1,846,560 | 2/1932 | Kattwinkel | 192/107 R |
| 2,054,210 | 9/1936 | Weisenburg | 192/107 R |
| 2,141,164 | 12/1938 | Brehm | 192/107 R |
| 2,178,527 | 10/1939 | Wellman | 428/550 |
| 2,199,620 | 5/1940 | Davis | 428/550 |
| 2,237,624 | 4/1941 | Oldham | 192/107 R |
| 3,037,860 | 6/1962 | Masterson et al. | 192/107 M |
| 3,435,935 | 4/1969 | Warman | 192/107 R |
| 3,610,383 | 10/1971 | Boseto | 192/107 M |
| 3,816,112 | 6/1974 | Heck | 75/208 R |
| 3,897,859 | 8/1975 | Norcia | 192/107 C |
| 3,946,192 | 3/1976 | Allen et al. | 219/149 |
| 3,948,354 | 4/1976 | Lowey, deceased | 188/251 K |
| 4,537,299 | 8/1985 | Fukatani | 192/107 C |
| 4,565,274 | 1/1986 | Cameron | 192/70.14 X |
| 4,747,476 | 5/1988 | East et al. | 192/107 R X |
| 4,846,329 | 7/1989 | Kettell et al. | 192/107 M |
| 4,865,177 | 9/1989 | Murakami | 192/107 R |
| 4,941,558 | 7/1990 | Schraut | 192/107 R X |

FOREIGN PATENT DOCUMENTS 322876 12/1929 United Kingdom ............ 192/107 R

Primary Examiner—Leslie A. Braun
Assistant Examiner—Andrea Pitts
Attorney, Agent, or Firm—Dykema Gossett

[57] ABSTRACT

A friction disc paddle for a rotatable clutch disc has powdered metal friction faces compacted directly on each face of a metal substrate. The friction faces extend through apertures in the metal substrate, and extend to the circumferential and radial edges of the metal substrate. The friction faces are solidly bonded to the metal substrate. The apertures not only ensure that the friction faces are securely attached to the metal substrate, but they also reduce the overall weight of the friction disc paddle.

6 Claims, 1 Drawing Sheet

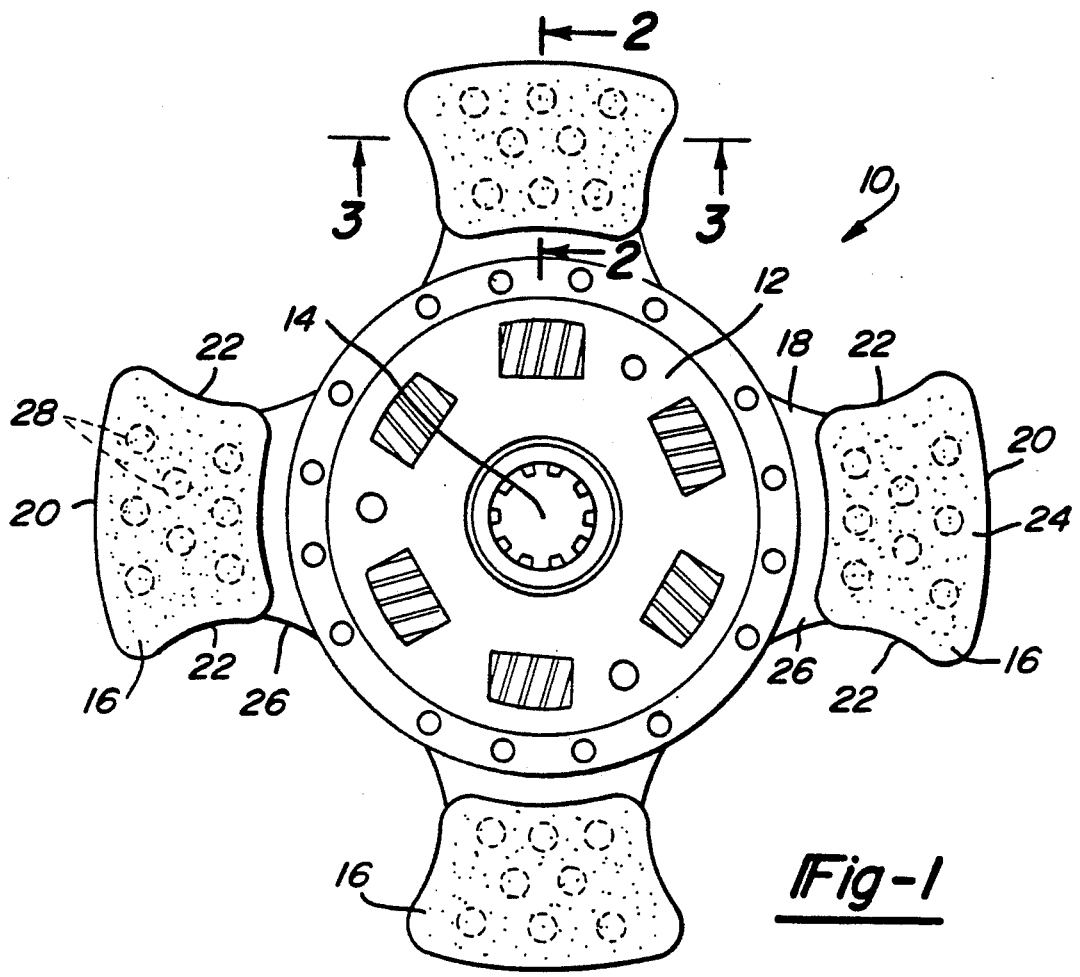
Fig-1
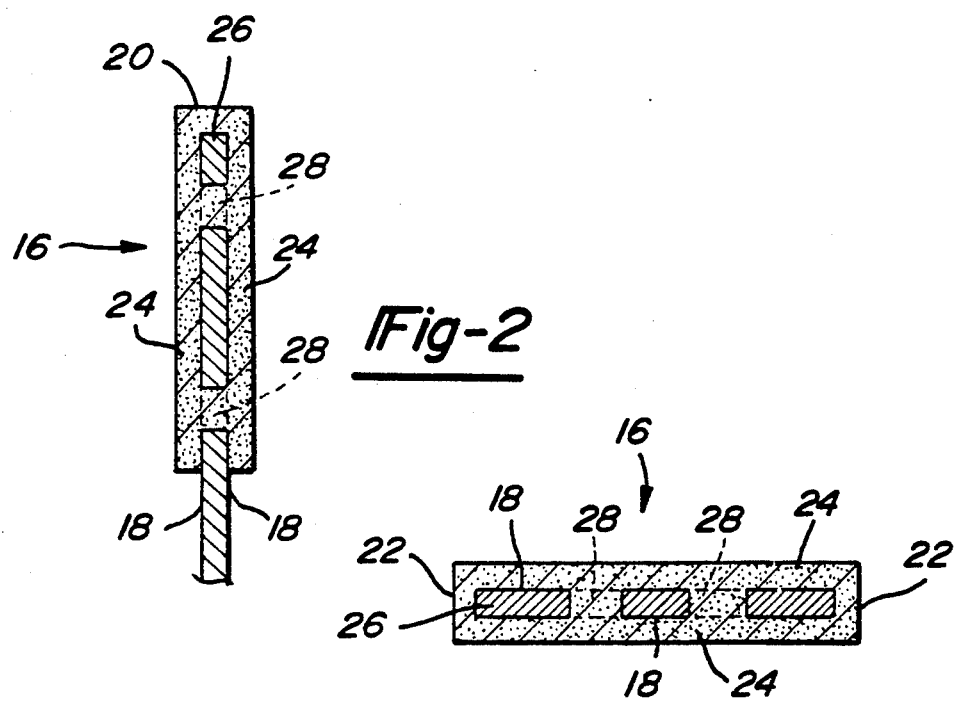
Fig-2
Fig-3

FRICTION FACINGS FOR CLUTCH PADDLES

BACKGROUND OF THE INVENTION

This invention relates to an improvement in attaching friction facings to paddles for clutch discs.

Fraction clutch assemblies include a driven disc which selectively transmits drive to and from the transmission. It is desirable for the driven disc to be as light as possible in order to reduce inertia. One of the ways in which driven discs have been improved to reduce inertia is by the use of paddles. In the paddle clutch disc, a plurality of circumferentially spaced paddles extend radially outwardly from a central hub. The paddles have friction facings on both faces of a metal substrate, and are selectively engaged with other discs to transmit rotation. The prior art paddles have a radially outer edge and two circumferential edges which define the circumferential extent of the paddle.

In the prior art, it has been somewhat difficult to attach friction facings to the metal substrate. It has been particularly difficult to maintain friction facings in areas adjacent to the circumferential edges. In these areas the friction facing may erode and break off during use. Further, exposed edges of the metal substrate may corrode.

SUMMARY OF THE MENTION

In a preferred embodiment, a disc includes a central hub and circumferentially spaced paddles extending radially outwardly from the hub. Each paddle includes a metal substrate having apertures. Friction facings are formed on both faces of the metal substrate. The friction facings extend to at least the outer circumferential edges of the metal substrate and may extend beyond these edges.

To form the friction facings for each paddle, powdered metal is compacted about both faces of tile metal substrate and extends through the apertures in the metal substrate. The paddle is then sintered to solidify the powdered metal to the underlying metal substrate.

By attaching the friction facings to the metal substrate in this manner, inertia of the driven disc is further reduced. The metal substrate is heavier than the friction facing material. Apertures ill the metal substrate not only serve to secure the friction facings, but also serve to reduce the overall weight of the driven disc.

By securing friction material over the radially outer edge and over the two circumferential edges of the paddle, the outer portion of the metal substrate is completely enclosed. This reduces exposure of the metal substrate to corrosive elements, and improves the bond of the friction facing.

These and other features of the present invention can best be understood from the following specification and drawings, of which the following is a brief description.

BRIEF DESCRIPTION OF THE DRAWINGS

FIG. 1 is an end view of a disc incorporating tile present invention.

FIG. 2 is a cross-sectional view along lines 2—2 as shown in FIG. 1.

FIG. 3 is a cross-sectional view along lines 3—3 as shown FIG. 1.

DETAILED DESCRIPTION OF A PREFERRED EMBODIMENT

A disc 10 illustrated in FIG. 1 may be used in a friction clutch or brake assembly. Disc 10 includes a hub 12 with a center of rotation 14 and a plurality of circumferentially spaced paddles 16 extending radially outwardly from hub 12. Each paddle 16 includes two outer facing surfaces 18, only one of which is shown in this figure, a radially outer edge 20 and spaced circumferential edges 22. Friction facings 24 are formed on facing surfaces 18 on both sides of paddles 16. The friction material which form the friction facings 24 may be compacted from powdered copper, iron, carbon, and silicia. Although this is the combination of powdered metals and nonmetals disclosed in the preferred embodiment, other combinations may be used.

Paddle 16 includes a metal substrate 26 which serves as backing for friction facings 24. Metal substrate 26 is formed of steel or other conventional materials and includes a plurality of apertures 28. The metal substrate 26 is formed of a material heavier than the powdered metal friction facing 24. Therefore, the apertures 28 in the metal substrate 26 also serve to reduce the overall weight of the paddle 16, thus reducing inertia.

In a preferred embodiment, paddles 16 have concave circumferential edges 22. This concave curvature is desirable to avoid localized deterioration of friction facings 24. Securing friction facing 24 adjacent to concave circumferential edges 22 may be difficult. The friction facing 24 adjacent to these circumferential edges 22 may erode and break off during use. Although concave circumferential edges 22 are disclosed, other shapes may be used.

As shown in FIG. 2, friction facings 24 extend through apertures 28 in the metal substrate 26. Further, friction facings 24 extend over an outer radial edge 20 of the metal substrate 26, enclosing the outer radial edge 20.

As shown in FIG. 3, friction facings 2& extend over and enclose circumferential edges 22 and outer radial edge 20. Forming the friction facings 24 on the metal substrate 26 in this manner minimizes exposure of the metal substrate 26 edges to environmental elements. The friction facing 24 is more likely to erode if the underlying metal substrate 26 has begun to corrode in areas adjacent to the friction facings 24.

To form friction facings 24 for each paddle 16, powdered metal is formed around the radially outer portions of metal substrate 26. The powdered metal is then compacted directly onto metal substrate 26, with the powdered metal extending through apertures 28. Paddle 16 is then sintered to solidify the powdered metal to the underlying metal substrate 26.

Apertures 28 not only ensure that the friction facings 24 are securely attached to metal substrate 26, they also reduce the overall weight of paddle 16. Thus, the inventive method achieves the goal of securing the friction facings 24 to the metal substrate 26, while at the same time reducing the weight of the paddle 16.

In one embodiment of the present invention, the friction material had a thickness of 0.1 inch from the surface of metal substrate 26. The metal substrate 26 also had a thickness of 0.1 inch. The nominal thickness of paddle 16 with friction facings 24 on each outer facing surfaces 18 was thus 0.3 inch The friction material also extended 0.1 inch from the radially outer edge 20 and each circumferential edge 22. In this embodiment, the radially outer edge 20 of the paddle 16 extended approximately 6.5 inches from the center of the hub 12. The width of the concave paddle 16 from one circumferential edge 22 to the other circumferential edge 22 had extremes of approximately 4.1 inches to 3.2 inches.

A preferred embodiment of the present invention has been disclosed. A worker of ordinary skill in the art, however, would recognize that certain modifications would come within the scope of this invention. For that reason, the following claims should be studied in order to determine the true scope and content of this invention.

What is claimed is:

1. A friction disc having a circumferentially discontinuous friction surface, said friction disc comprising:
   a hub having a center of rotation;
   a plurality of circumferentially spaced paddles extending radially outwardly from said hub, said paddles formed from a metal substrate, each said paddle having a radially inner edge and a radially outer edge, said paddle extending circumferentially between circumferential edges and having at least one aperture extending through said paddle; and
   a plurality of pairs of circumferentially spaced powdered metal friction faces, each said pair of friction faces being formed at radially outer portions of both faces of said paddle and integrally connected by a portion extending through said aperture, said pair of friction faces extending beyond said circumferential edges;
   wherein outer circumferential edges of each said pair of said friction faces on opposing faces of said paddle are integrally joined to partially enclose a portion of said circumferential edges of said paddle.

2. A friction disc as recited in claim 1, wherein said circumferential edges are concave.

3. A friction disc as recited in claim 1, wherein there are a plurality of said apertures.

4. A friction disc having a circumferentially discontinuous friction surface, said friction disc comprising:
   a hub having a center of rotation;
   a plurality of circumferentially spaced paddles extending radially outwardly from said hub, said paddles formed from a metal substrate, each said paddle having a radially inner edge and a radially outer edge, said paddle extending circumferentially between circumferential edges and having at least one aperture extending through said paddle; and
   a plurality of pairs of circumferentially spaced powdered metal friction faces, each said pair of said friction faces being formed at radially outer portions of both faces of said paddle and integrally connected by a portion extending through said aperture, said pair of friction faces extending to both said circumferential edges, and said pair of friction faces extending beyond said radially outer edge;
   wherein radially outer edges of each said pair of said friction faces on opposing faces of said paddle are integrally joined to partially enclose a portion of said radially outer edge of said paddle.

5. A friction disc as recited in claim 4, wherein said circumferential edges are concave.

6. A friction disc as recited in claim 4, wherein there are a plurality of said apertures.

* * * * *